(12) United States Patent
Sugimoto et al.

(10) Patent No.: US 11,440,204 B2
(45) Date of Patent: Sep. 13, 2022

(54) HANDLING UNIT AND HANDLING DEVICE

(71) Applicant: DAIYA SEIKI CO., LTD., Nagano (JP)

(72) Inventors: Shunro Sugimoto, Nagano (JP); Tadashi Fujinawa, Nagano (JP); Yuji Oguchi, Nagano (JP)

(73) Assignee: DAIYA SEIKI CO., LTD., Nagano (JP)

( * ) Notice: Subject to any disclaimer, the term of this patent is extended or adjusted under 35 U.S.C. 154(b) by 71 days.

(21) Appl. No.: 17/054,887

(22) PCT Filed: Jun. 18, 2018

(86) PCT No.: PCT/JP2018/023074
§ 371 (c)(1),
(2) Date: Nov. 12, 2020

(87) PCT Pub. No.: WO2019/244195
PCT Pub. Date: Dec. 26, 2019

(65) Prior Publication Data
US 2021/0221010 A1    Jul. 22, 2021

(51) Int. Cl.
*B25J 15/08* (2006.01)
(52) U.S. Cl.
CPC .................... *B25J 15/08* (2013.01)
(58) Field of Classification Search
CPC ........ B25J 15/08; B25J 15/10; B25J 15/0293; B25J 9/14; B25J 9/1612; B25J 19/02;
(Continued)

(56) References Cited

U.S. PATENT DOCUMENTS 5,108,140 A * 4/1992 Bartholet ............. B25J 15/0009
294/115
7,901,170 B2 * 3/2011 Usui ..................... B25B 31/005
411/57.1
(Continued)

FOREIGN PATENT DOCUMENTS

JP      S52-109678 U    8/1977
JP      H07-24581 U     5/1995
(Continued)

OTHER PUBLICATIONS

PCT, International Search Report for the corresponding patent application No. PCT/JP2018/023074, dated Sep. 11, 2018, with English translation.
(Continued)

*Primary Examiner* — Stephen A Vu
(74) *Attorney, Agent, or Firm* — Lucas & Mercanti, LLP

(57) ABSTRACT

A handling unit comprises: a collet integrally having a reference part, a plurality of elastic deformation parts connected to the tip side of the reference part, finger parts respectively connected to the tip sides of the elastic deformation parts, and a driven part that receives a driving force; a housing having a cylinder structure formed on the base end side or the outer circumferential side of the collet and provided with a fluid supply port and having a collet locking part that locks the collet at a locking position; and an operation body having a driving part that imparts a driving force to the driven part, a pressure reception part that receives the pressure of a fluid supplied from the fluid supply port, and a cylinder slide contact part that makes slide contact with the internal surface of the cylinder structure.

19 Claims, 6 Drawing Sheets

(58) Field of Classification Search
CPC ... B23B 31/001; B23B 31/204; B23B 31/206; B23B 31/402
See application file for complete search history.

(56) References Cited

U.S. PATENT DOCUMENTS

| | | | |
|---|---|---|---|
| 9,415,520 B2* | 8/2016 | Sanders | B25J 17/0275 |
| 10,766,148 B2* | 9/2020 | Watanabe | B25J 15/10 |
| 2005/0082770 A1 | 4/2005 | Siev et al. | |
| 2018/0236666 A1* | 8/2018 | Mozeika | B25J 9/1612 |

FOREIGN PATENT DOCUMENTS

| | | |
|---|---|---|
| JP | H10-156783 A | 6/1998 |
| JP | 2002-219682 A | 8/2002 |
| JP | 2003-071771 A | 3/2003 |
| WO | 2002/058897 A1 | 8/2002 |

OTHER PUBLICATIONS

PCT, Written Opinion of the International Searching Authority for the corresponding patent application No. PCT/JP2018/023074, dated Sep. 11, 2018, with machine English translation.

EPO, Extended European Search Report for the corresponding European patent application No. 18923089.9, dated Dec. 3, 2021.

KIPO, Office Action for the corresponding Korean patent application No. 10-2020-7028449, dated Dec. 20, 2021, with machine English translation.

JPO, Notice of Allowance for the corresponding Japanese patent application No. 2020-525082, dated Feb. 16, 2022, with machine English translation.

PCT, English Translation of Written Opinion of the International Searching Authority for the corresponding patent application No. PCT/JP2018/023074, dated Sep. 11, 2018.

* cited by examiner

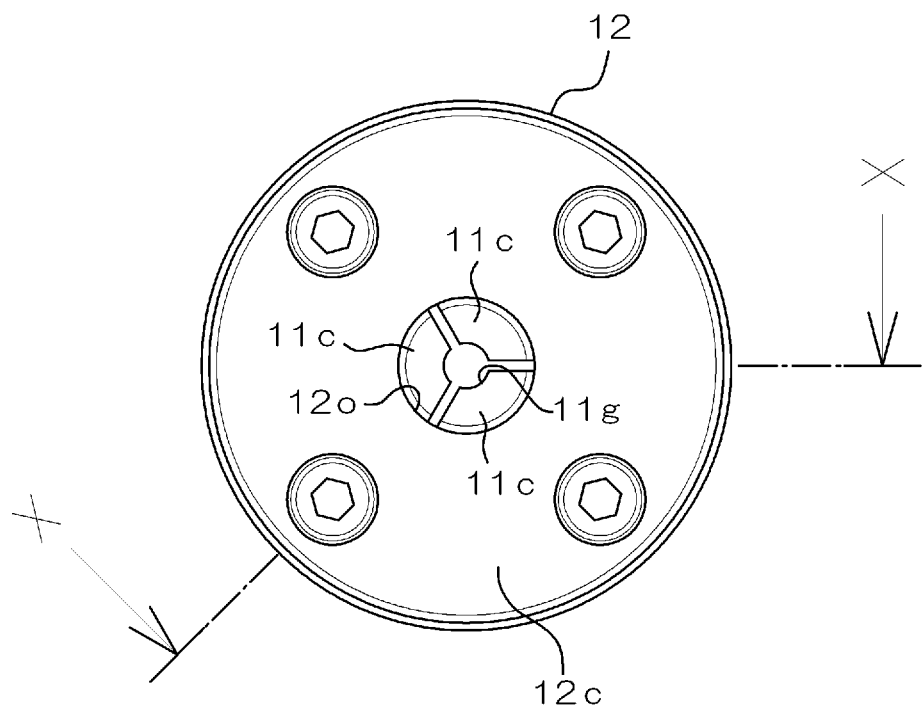
Fig. 2
Fig. 3
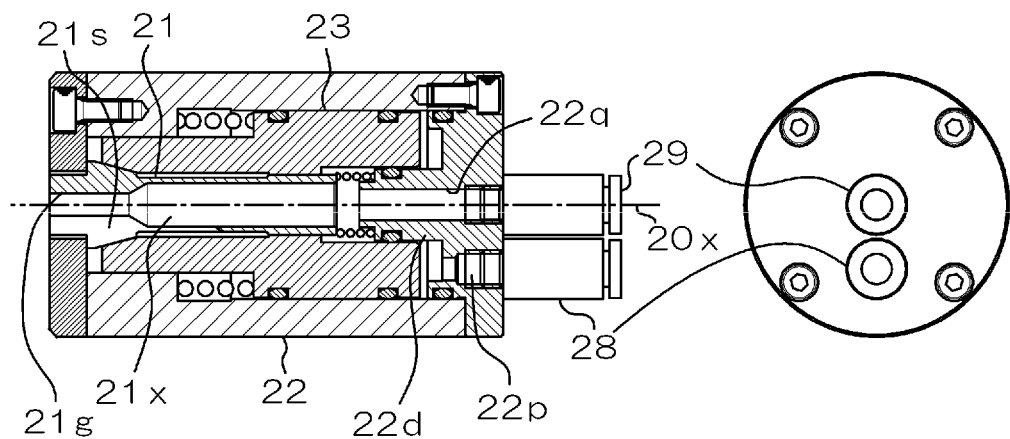
(a)　　　　　　　　　　　(b)

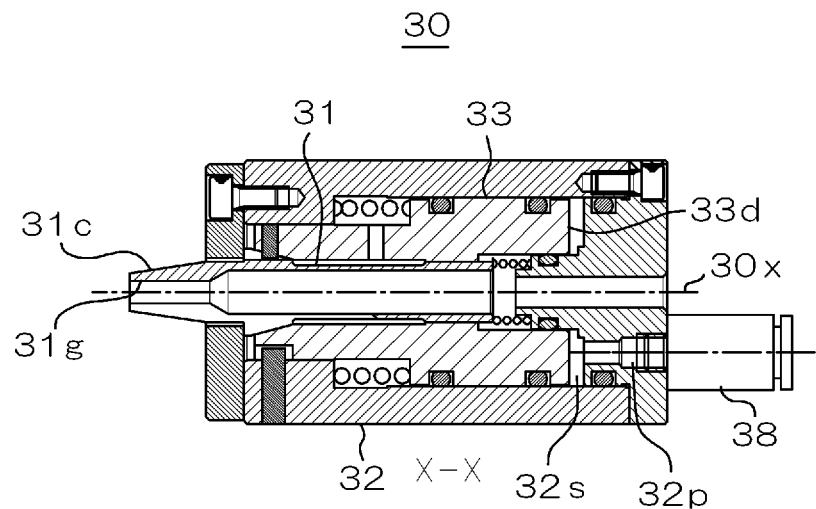
Fig. 4
Fig. 5
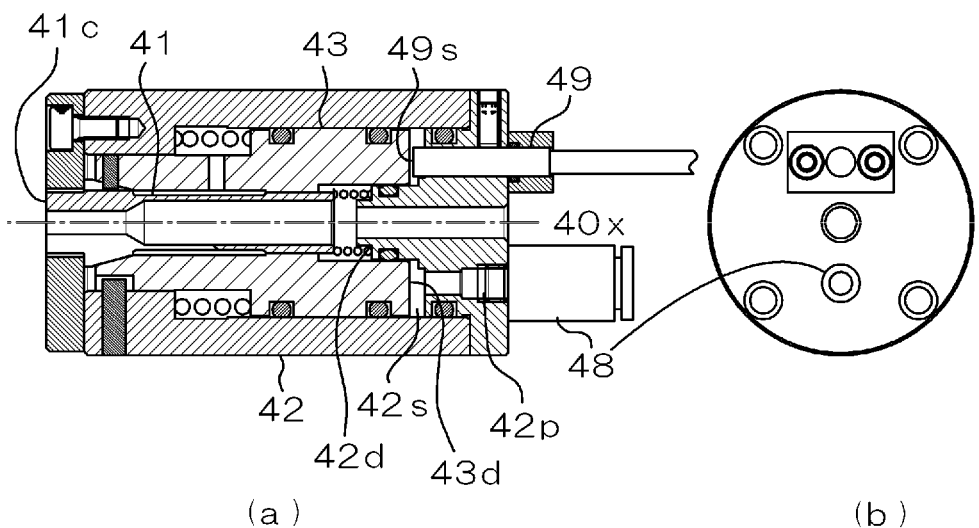
(a)　　　　　　　　　　　(b)

(a) (b)

(a) (b)

HANDLING UNIT AND HANDLING DEVICE

CROSS REFERENCE TO RELATED APPLICATION

This Application is a 371 of PCT/JP2018/023074 filed on Jun. 18, 2018, the above application is incorporated herein by reference.

TECHNICAL FIELD

The present invention relates to a handling unit and a handling device and, more particularly, to a handling unit including a gripping part which is attached, for example, to a robot arm tip of a handling device to grip an object and is suitably used for various applications such as transfer, distribution, unloading, loading, and processing.

BACKGROUND ART

Conventionally, a handling unit including a gripping part which grips an object is known as a type of end effector attached, for example, to a robot arm tip of a handling device. As this type of handling unit, a handling unit is known, which is provided with a plurality of fingers (claws) which can mutually open and close. Some handling units include a driving mechanism configured to allow a plurality of fingers to individually operate. In addition, there are known units described in Patent Documents 1 and 2 described below, which have a plurality of fingers integrally formed into a collet and cause a predetermined driving mechanism to make the fingers of the collet simultaneously operate.

The lid gripping device disclosed in Patent Document 1 has a gripping part formed by using a collet chuck with a wedge clamp part and a clamp part operating in cooperation with each other. This device is provided with a solenoid which makes the collet chuck actively operate in the axial direction. In addition, a return spring is installed in the device to drag the wedge clamp part into the clamp part. The work chucking device disclosed in Patent Literature 2 has a gripping part formed from an ER type collet. This device is provided with a driving mechanism having an air cylinder structure for driving the collet in the radial direction and a compression coil spring and a wire spring which serve to restore the collet to the opposite return side in the axial direction and the radial direction.

PRIOR ARTS

Patent Documents

Patent Document 1: Japanese Unexamined Patent Publication No. H11-281649
Patent Document 2: Japanese Utility Model No. 2605038

SUMMARY OF INVENTION

Technical Problem

The lid gripping device described in Patent Document 1 has the following problems. Since the collet chuck and the solenoid for driving the collet chuck are arrayed in the axial direction, the integrity between the gripping part and the driving system is low, resulting in an increase in the entire device size. In addition, since the collet chuck is made to operate in the axial direction to perform a gripping operation, the positional accuracy of the collet is difficult to maintain, so that there is a problem in which gripping accuracy and/or repetition accuracy of the gripping portion are likely to deteriorate.

In contrast, although the chucking device described in Patent Document 2 is relatively compact since the collet and the air cylinder structure are arranged adjacent to each other, this device is similar to the above device in terms of having the two components arrayed in the axial direction, and it is structurally difficult to achieve greater downsizing of the collet than the embodiment. In addition, a collet 12 is configured to only locally come into contact with a head cap part 3 and a piston body 20, respectively, and to be forcibly restored by a wire spring 15 and/or a compression coil spring 18, therefore, the positional accuracy of the collet is difficult to maintain, so that there is a problem in which gripping accuracy and/or repetition accuracy of the gripping portion are likely to deteriorate.

It is therefore an object of the present invention to provide a handling unit which makes it easy to achieve size reduction and/or weight reduction and which can ensure gripping accuracy and/or repetition accuracy.

Solution to Problem

In order to solve the above problem, a handling unit according to the present invention includes a collet integrally having a reference part provided on part of the collet in an axial direction, a plurality of elastic deformation parts connected to an axial direction tip side of the reference part, a plurality of finger parts respectively connected to the axial direction tip sides of the plurality of elastic deformation parts, and a plurality of driven parts which is formed to make the plurality of finger parts and which moves in a radial direction and which receives driving force for causing elastic deformation of the plurality of elastic deformation parts, a housing which accommodates the collet and which has a cylinder structure formed on an outer circumferential side or an axial direction base end side of the collet and having a fluid supply port, and a collet locking part which locks the collet at a predetermined locking position in the axial direction, and an operation body having a driving part which gives the plurality of driven parts the driving force for causing the elastic deformation, a pressure reception part which receives fluid pressure supplied from the fluid supply port inside the cylinder structure, and a cylinder slide contact part which comes into slide contact with an internal surface of the cylinder structure so as to be hermetically movable in the axial direction. In this case, the reference part is preferably in a state where its coaxial position and posture with respect to an axis are held by the housing or the operation body.

In the present invention, the collet locking part of the housing preferably locks the collet from the axial direction tip side, and the collet is preferably prevented by the collet locking part at the predetermined locking position from moving to the axial direction tip side. In this case, the collet is preferably configured so as to be movable from the predetermined locking position to the axial direction base end side. In addition, the handling unit preferably further includes an collect biasing means configured to hold the collet in a state in which the collet is locked to the collet locking part by biasing the collet to the axial direction tip side with respect to the housing. The collet biasing means is preferably configured from an elastic body provided between the collet and the housing to give an elastic restoring force.

In the present invention, the coaxial position and posture of the reference part with respect to the axis may be held by causing the reference part to come into slide contact with an collet slide contact part provided on the operation body so as to be movable in the axial direction. Here, the collet may be placed on an outer circumferential side or an inner circumferential side of the operation body. In these cases, when a pressure reception part receives the fluid pressure to cause the operation body to move to the axial direction tip side, the driving part preferably gives a driving force to the plurality of driven parts of the collet while the cylinder slide contact part slides on the internal surface of the cylinder structure and the collet slide contact part slides on the collet. In addition, in a case where the collet is placed on the outer circumferential side of the operation body, the coaxial position and posture of the reference part with respect to the axis are fixed by supporting the reference part on an internal surface provided on the housing.

In the present invention, the operation body is preferably provided with the collet slide contact part in a range in the axial direction which overlaps a range in the axial direction in which the cylinder slide contact part and the internal surface of the cylinder structure are air-tightly configured. Here, in a case where only a single seal member is placed between the cylinder side slide contact part and the internal surface of the cylinder structure, the range in the axial direction in which the cylinder side slide contact part and the internal surfaced of the cylinder structure are air-tightly configured is the range in the axial direction in which the seal member is placed, and alternatively, in a case where a plurality of seal members are arrayed, the above range is the range in the axial direction which is laid between the farthest seal members among the plurality of seal members.

In the present invention, the housing preferably has a tip side internal surface portion provided on the internal surface of the axial direction tip side and a base end side internal surface portion provided on the internal surface of the cylinder structure through a first stepped part which increases an inner dimension of the tip side internal surface portion on the axial direction base end side, the operation body preferably has a tip side outer surface portion provided on an outer surface in a range in which a position in the axial direction overlaps the tip side internal surface portion and a base end side outer surface portion including the cylinder slide contact part provided through a second stepped part which increases an outer dimension of the tip side outer surface portion on the axial direction base end side, and the first stepped part is preferably formed on the axial direction tip side with respect to the second stepped part. In this case, a operation body biasing means for biasing the operation body to the axial direction base end side is preferably further provided between the first stepped part and the second stepped part. The operation body biasing means is preferably configured by an elastic body accommodated between the first stepped part and the second stepped part and configured to give an elastic restoring force.

In this case, it is preferable that, in a state where the tip side outer surface portion of the operation body is supported on the tip side internal surface portion of the housing from the outer circumferential side, the driving part of the operation body drives the plurality of driven parts of the collet to the inner circumferential side. In addition, the cylinder slide contact part of the operation body and the internal surface of the cylinder structure are preferably air-tightly configured with each other by a seal member interposed between the base end side outer surface portion of the operation body and the base end side internal surface portion of the housing.

In the present invention, an axial hole is preferably provided inside of the collet, and a fluid supply/discharge port is preferably provided to enable supply of a fluid from the inside of the axial hole to the axial direction tip side or discharge of a fluid from the axial direction tip side through the axial hole. Here, the fluid supply/discharge port is preferably open to a base end surface of the housing.

A handling device according to the present invention includes one of the handling units described above, a unit driving system which determines a position and posture of the handling unit, a fluid supply means for supplying a fluid into the cylinder structure, and a control unit which controls the unit driving system and the fluid supply means. Here, the handling device preferably further includes an operation body position detection means for detecting a position of the operation body in the cylinder structure in the axial direction. In addition, the present invention preferably further includes a collet position detection means for detecting a position of the collet in the axial direction. Furthermore, the present invention preferably further includes a gripping mode detection means for detecting an individual displacement mode such as vibration, distortion, or displacement of the plurality of finger parts or the plurality of elastic deformation parts, or a difference in or a ratio of the individual displacement mode. Moreover, the present invention preferably further includes a gripping-object detection means for detecting a physical amount of an object to be gripped which is gripped by the plurality of finger parts. This gripping-object detection means can be formed from various types of detectors such as thermocouples, conductivity sensors, or vibration sensors, which are provided for the plurality of finger parts.

In this case, the fluid supply means preferably includes a pressure adjuster, and the control unit is preferably configured to be able to adjust the fluid pressure by controlling the pressure adjuster. At this time, the fluid pressure is preferably adjusted in accordance with at least one of detection results obtained from the operation body position detection means, the gripping mode detection means, and the gripping-object detection means. In addition, the control unit preferably controls the unit driving system and corrects the position or posture of the handling unit on the basis of at least one of detection results obtained from the collet position detection means and the gripping mode detection means. Further, the control unit preferably selects a processing content for the object to be gripped which is gripped by the plurality of finger parts from a plurality of options on the basis of the detection results obtained from the operation body position detection means, the gripping mode detection means, or the gripping-object detection means. At this time, the control unit preferably controls at least one of the fluid supply means and the unit driving system in accordance with the selected processing content.

Advantageous Effects of Invention

The present invention can provide a handling unit which makes it easy to achieve size reduction and/or weight reduction and which can ensure gripping accuracy and/or repetition accuracy. In addition, a handling device can realize a satisfactory operation state suitable for the gripping characteristics of a collet.

BRIEF DESCRIPTION OF DRAWINGS

FIG. 2 is a front view of the handling unit according to the first embodiment.

FIGS. 3(a) and 3(b) are respectively a longitudinal sectional view and a rear view of a handling unit according to a second embodiment.

FIG. 4 is a longitudinal sectional view of a handling unit according to a third embodiment.

FIGS. 5(a) and 5(b) are respectively a longitudinal sectional view and a rear view of a handling unit according to a fourth embodiment.

DESCRIPTION OF EMBODIMENTS

Figure 1:
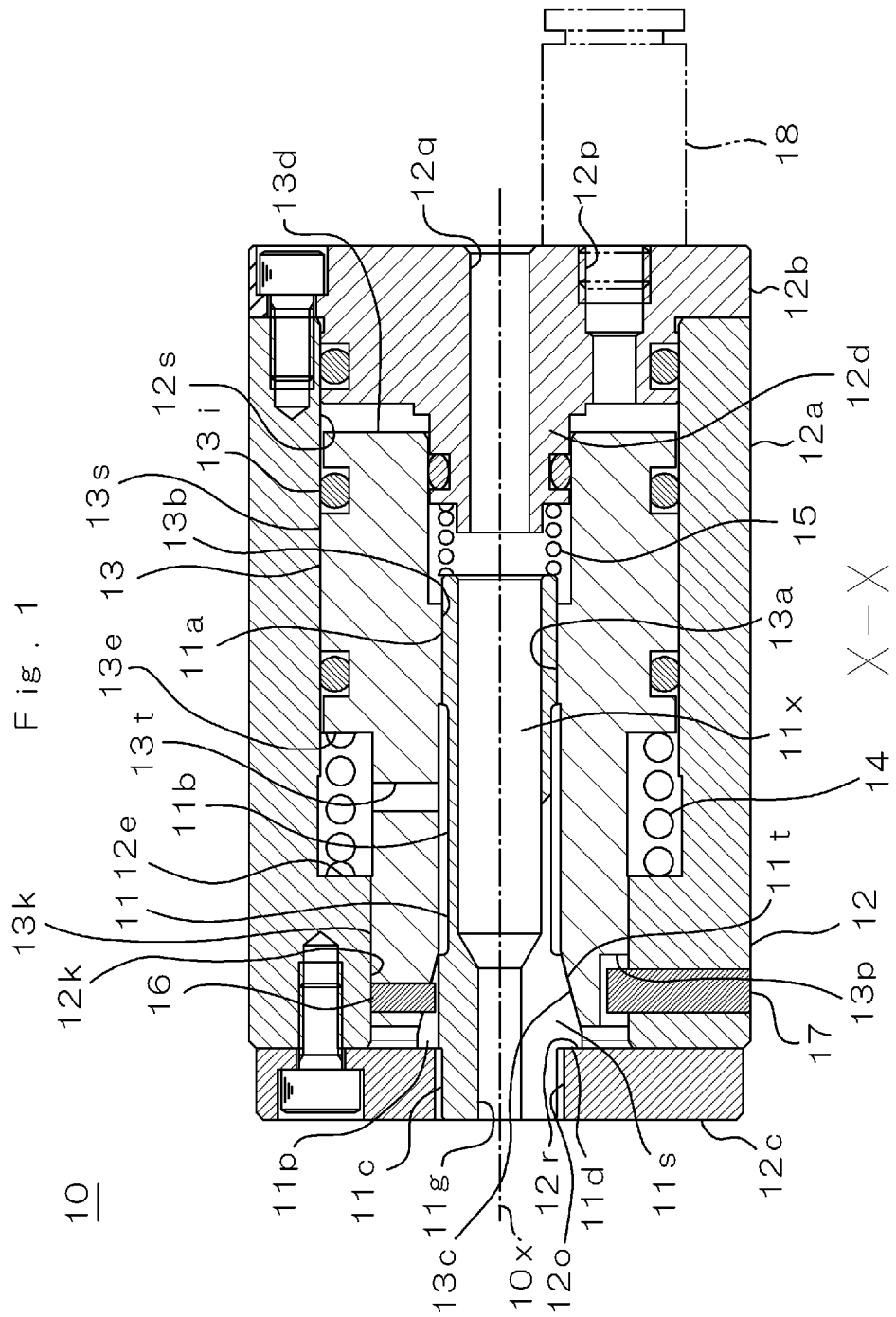
FIG. 1 is a longitudinal sectional view (a sectional view taken along line X-X in FIG. 2) of a handling unit according to a first embodiment of the present invention.

The embodiments of the present invention shall now be described in detail with reference to the accompanying drawings. First, the arrangement of a first embodiment having the basic arrangement according to the present invention is described with reference to FIGS. 1 and 2. A handling unit 10 according to the present embodiment includes a collet 11, a housing 12 accommodating the collet 11, and an operation body 13 which works on the collet 11 inside the housing 12.

The collet 11 has a reference part 11a which forms part of the collet in an axial direction. In the shown example, the reference part 11a is supported to be slidable along an axis 10x with respect to an internal surface of the operation body 13 (to be described later), thereby in a state where a coaxial position and posture of the reference part 11a are held with respect to the axis 10x. In the shown example, the reference part 11a is formed into an integral cylindrical shape having a cylindrical plane shaped an outer circumferential surface formed to have a uniform diameter along the axis 10x. A plurality of elastic deformation parts 11b is connected to a tip side (shown on the left side in the drawing and simply referred to as the "an axial direction tip side" hereinafter) of the reference part 11a in the direction of the axis 10x. The plurality of elastic deformation parts 11b is configured to have shape dimensions which make the plurality of elastic deformation parts 11b more easily elastically deformable than the reference part 11a. In the shown example, the plurality of elastic deformation parts 11b is thinner than the reference part 11a and divided with slits 11s in a circumferential direction around the axis 10x. This structure makes the plurality of elastic deformation parts 11b individually easily elastically deformable. In the shown example, three of elastic deformation parts 11b are formed at equal angular intervals around the axis 10x so as to have threefold symmetry around the axis 10x. An axial hole 11x extends through an inside of the collet 11 along the axis 10x in the axial direction.

A plurality of finger parts 11c is connected to the axial direction tip side of the plurality of elastic deformation parts 11b, respectively. The plurality of finger parts 11c has a plurality of gripping surfaces 11g facing the axis 10x, respectively. Although in the shown example, the plurality of gripping surfaces 11g is formed from an inner circumferential surface having an arcuately cylindrical shape centered on the axis 10x (having a central angle of little less than 120°), the plurality of gripping surfaces is not limited to this and may have an arbitrary internal surface shape such as an elliptical shape or flat shape as long as it conforms to an object to be gripped (not shown). A locking stepped part 11d facing the axial direction tip side is provided on an outer surface of each of finger parts 11c, and a plurality of driven parts 11t having a conical surface shape is provided on a base end side in the direction of the axis 10x of the locking stepped part 11d (shown on the right side in the drawing and simply referred to as the "an axial direction base end side" hereinafter) and is inclined toward the axial direction base end side for each of elastic deformation parts 11b and each of finger parts 11c. In addition, part (one) of the driven surface 11t is provided with a regulating groove 11p which extends along the axis 10x and is open to an outer circumferential side.

The housing 12 has a tubular (cylindrical in the shown example) main body 12a, a base end part 12b attached to the axial direction base end side of the main body 12a, and a tip part 12c attached to the axial direction tip side of the main body 12a. A cylinder structure 12s is provided inside the housing 12, and a fluid supply port 12p communicating with the inside of the cylinder structure 12s is formed in the base end part 12b. In the shown example, the cylinder structure 12s is formed in a range extending from the outer circumferential side of the reference part 11a of the collet 11 to the axial direction base end side. An inner stepped part 12e (first stepped part) which is a stepped structure whose inner dimension (an inner diameter in the shown example) increases from the axial direction tip side to the axial direction base end side is formed on an internal surface of the main body 12a. The inner stepped part 12e is formed between an internal surface portion (base end side internal surface portion) of the cylinder structure 12s along the axis 10x and a support part 12k (tip side internal surface portion) which supports a driving part 13c of the operation body 13 (to be described later) from the rear side. An outer circumferential side regulating pin 17 protruding inwardly is attached to the housing 12 at a position closer to the axial direction tip side than the inner stepped part 12e described above.

A support part 12d is formed at a central portion centered on the axis 10x of the base end part 12b. A vent port 12q communicating with the axial hole 11x is formed in the support part 12d. Meanwhile, the tip part 12c is provided with an opening part 12o communicating with the inside of the main body 12a at a central portion through which the axis 10x passes. The plurality of finger parts 11c of the collet 11 and a gripping space where an object to be gripped is gripped with the gripping surfaces 11g of the finger parts 11c are arranged in the opening part 12o. An opening inner edge of the opening part 12o which faces the inside of the main body 12a is formed into a collet locking part 12r which comes into contact with the locking stepped part 11d of the collet 11 from the axial direction tip side.

The operation body 13 is formed into a tubular shape (sleeve shape) extending from a base end part to a tip part along the axis 10x. An inner circumferential part of the operation body 13 is provided with an axial hole 13a accommodating the collet 11. A support surface part 13b which supports the reference part 11a of the collet 11 so as to make the reference part 11a slidable in the axial direction is formed in a part of the axial hole 13a in the axial direction.

In the shown example, the support surface part 13b is formed from a cylindrical internal surface centered on the axis 10x. The operation body 13 is provided with the driving part 13c formed from a conical inclined surface which imparts driving force to the plurality of driven parts 11t of the collet 11. When the driving part 13c comes into contact with the plurality of driven parts 11t, the plurality of elastic deformation parts 11b elastically deform, and the plurality of finger parts 11c moves in a direction to grip an object to be gripped (to the inner circumferential side in the shown example). In addition, an inner circumferential side regulating pin 16 which is introduced so as to be movable with respect to the regulating groove 11p in the axial direction is attached to the tip part (driving part 13c) of the operation body 13. The engagement of the inner circumferential side regulating pin 16 and the regulating groove 11p regulates the relative rotation of the collet 11 and the operation body 13 around the axis 10x. Further, at an angular position around the axis 10x, which is different from the axis of this regulating structure, the tip part of the operation body 13 is provided with a regulating groove 13p which accommodates the outer circumferential side regulating pin 17 attached to the housing 12 so as to make the pin 17 movable along the axis 10x and which is open to an outer circumferential side. The engagement of the outer circumferential side regulating pin 17 and the regulating groove 13p regulates the relative rotation of the operation body 13 and the housing 12 around the axis 10x.

The base end part of the operation body 13 is provided with a pressure reception part 13d which is placed inside the cylinder structure 12s formed from the housing 12 and receives the fluid pressure generated by the fluid supplied from the fluid supply port 12p. In the shown example, the pressure reception part 13d is formed from an end face of the tubular operation body 13 which is located on the axial direction base end side. An outer surface portion of the operation body 13 which extends from the pressure reception part 13d to the axial direction tip side is provided with a cylinder slide contact part 13s which comes into slide contact with an internal surface (an internal surface portion along the axis 10x) of the cylinder structure 12s so as to be movable in the axial direction. A deformable seal member 13i such as a packing is interposed between the cylinder slide contact part 13s and the internal surface of the cylinder structure 12s, and the cylinder slide contact part 13s of the operation body 13 thereby becomes airtight with respect to the cylinder structure 12s.

An outer stepped part 13e (second stepped part) as a stepped structure whose outer dimension (the outer diameter in the shown example) increases from the axial direction tip side to the axial direction base end side is formed on the outer surface of the operation body 13. The outer stepped part 13e is formed between the cylinder slide contact part 13s (base end side outer surface portion) and a supported part 13k (tip side outer surface portion) which comes into slide contact with the support part 12k so as to be movable in the axis direction 10x. Here, the inner stepped part 12e is formed on the axial direction tip side relative to the outer stepped part 13e. An operation spring 14 (operation body biasing means), which is a coil spring in the shown example, is placed (accommodated) between the inner stepped part 12e and the outer stepped part 13e. The operation spring 14 returns the operation body 13 to the axial direction base end side with an elastic restoring force when the fluid pressure of the fluid supplied from the fluid supply port 12p is reduced or eliminated. This reduces or eliminates the driving force applied from the plurality of driving parts 13c to the driven part 11t. Accordingly, the elastic deformation of the plurality of elastic deformation parts 11b of the collet 11 is reduced or eliminated, and the plurality of finger parts 11c are restored from a gripped state of an object to be gripped to a position in a radial direction corresponding to a non-gripped state before the gripping of the object to be gripped. Here, a vent path 13t causes the space between the inner stepped part 12e and the outer stepped part 13e to communicate with the outside. However, the space may be filled with a compressible fluid (air and/or a gas, etc.) without forming the vent path 13t, and the above operation body biasing means may be configured to exert an elastic restoring force with the pressure of the fluid.

A holding spring 15 (collet biasing means) formed from a coil spring in the shown example is provided between the base end part of the collet 11 and the support part 12d of the housing 12. The holding spring 15 biases the collet 11 to the axial direction tip side. Thereby, in a state where no external force is applied to the collet 11, the locking stepped part 11d is held in a state where the locking stepped part 11d is in contact with the collet locking part 12r (at the locking position). The collet 11 is configured to be movable in a direction along the axis 10x by the slide contact structure of the reference part 11a with respect to the support surface part 13b of the operation body 13 in a state where a coaxial position and posture of the collet 11 are held with respect to the axis 10x.

In the handling unit 10 described above, the fluid pressure of fluid such as air supplied from the fluid supply port 12p is applied to the pressure reception part 13d through a shown connector 18 attached to the base end part 12b of the housing 12 and the like in the non-gripped state shown in FIG. 1, the operation body 13 thereby moves to the axial direction tip side against biasing force of the operation spring 14. This causes the driving part 13c to apply driving force to the plurality of driven parts 11t. Consequently, the plurality of elastic deformation parts 11b of the collet 11 elastically deform, and the plurality of finger parts 11c move to the inner circumferential side. With this operation, when an object to be gripped (not shown) is placed inside the plurality of finger parts 11c, the object to be gripped is gripped by the plurality of finger parts 11c.

In a shifting process from the above non-gripped state to the gripped state, when the operation body 13 moves to the axial direction tip side, the support surface part 13b of the operation body 13 slides on the reference part 11a of the collet 11. At this time, since the surface of the support surface part 13b is a surface along the axis 10x, the coaxial position and posture of the collet 11 including the reference part 11a having a surface similar to the above surface are held with respect to the axis 10x. As long as the collet 11 receives no external force, the holding spring 15 maintains a state in which the locking stepped part 11d of the collet 11 contacts the collet locking part 12r of the housing 12, therefore, the position of the collet 11 with respect to the housing 12 in the axial direction is fixed. With these configurations, in the above shifting process, the plurality of finger parts 11c of the collet 11 operate with high accuracy (high gripping accuracy and its repetition accuracy) with respect to an object to be gripped in a state where a coaxial position and posture of each of the plurality of finger parts 11c with respect to the axis 10x and a position of each of the plurality of finger parts 11c in the axial direction are held.

In the present embodiment, the collet 11 and the operation body 13 are accommodated in the housing 12 with the structure which allows the collet 11 and the operation body 13 to directly slide in the radial direction. This makes it possible to achieve downsizing in the radial direction. In particular, the structure for driving the operation body 13 to the axial direction tip side with a fluid pressure is provided on the axial direction base end side by using the cylinder structure 12s, the pressure reception surface 13d, and the cylinder slide contact part 13s, and the function for returning the operation body 13 to the axial direction base end side with the operation body biasing means including the operation spring 14, etc., is provided in the space between the housing 12 and the operation body 13 on the axial direction tip side. This makes it possible to achieve downsizing in the axial direction tip side more easily. In addition, by changing a fluid pressure in the manner described later, a unit which can easily adjust the gripping force generated by the difference between the fluid pressure and the biasing force of the operation body biasing means can be realized.

In addition, in the present embodiment, a slide contact structure for the reference part 11a and the support surface part 13b is placed in a range of an airtight seal region of the cylinder slide contact part 13s of the operation body 13 with respect to the internal surface of the cylinder structure 12s in the axial direction, therefore, part of the cylinder structure 12s is also placed on the outer circumferential side of the collet 11 (in particular, the reference part 11a). This makes it possible to realize downsizing in the axial direction. In addition, by placing the support surface part 13b on the inner circumferential side of the above seal region of the cylinder structure 12s, this makes it possible to improve the position and posture accuracy of the support surface of the support surface part 13b. This can further improve the gripping accuracy and/or repetition accuracy of the collet 11.

Further, in the present embodiment, the inner stepped part 12e having a step height corresponding to the difference in the inner dimension (the inner diameter) between the support part 12k and the internal surface of the cylinder structure 12s is provided between the support part 12k of the housing 12 which is located on the axial direction tip side and the internal surface of the cylinder structure 12s on the axial direction base end side, and the outer stepped part 13e having a step height corresponding to the difference in the outer dimension (the outer diameter) between the supported part 13k and the cylinder slide contact part 13s is provided between the supported part 13k of the operation body 13 which is located on the axial direction tip side and the cylinder slide contact part 13s on the axial direction base end side. This structure makes it possible to easily achieve a large gripping force by ensuring a large operation area for the cylinder structure formed by the cylinder structure 12s and the pressure reception part 13d and the cylinder slide contact part 13s of the operation body 13, and to facilitate the downsizing of the structure in the axial direction tip side.

In the present embodiment, the inner circumferential side regulating pin 16 and the outer circumferential side regulating pin 17 regulate the collet 11 and the operation body 13 with respect to the housing 12 in the rotation direction. This makes it possible to arbitrarily set a gripping shape of an object to be gripped which can be gripped by the plurality of gripping surfaces 11g of the plurality of finger parts 11c to a rectangular sectional shape, elliptical sectional shape, etc., as well as a circular sectional shape. Note that a rotation posture of the handling unit 10 is matched with the posture of an object to be gripped under the control of a unit driving system including a control unit 101 of a handling device 100 (to be described later).

Further, in the present embodiment, the collet 11 is configured to be movable in a predetermined range in the housing 12 in the axial direction. Therefore, even in a case where, when the handling unit 10 accesses an object to be gripped, abnormal interference occurs between the plurality of finger parts 11c and the outside due to a position control failure of the handling unit 10, a placement failure and a shape failure of the object to be gripped, etc., damage to the collet 11 can be prevented by retreating the collet 11 to the axial direction base end side along the axis 10x. In addition, there is no possibility that the operation accuracy decreases even after this retreating operation since the slide contact structure formed by the reference part 11a and the support surface part 13b holds the coaxial position and posture of the collet 11 with respect to the axis 10x.

The tip part 12c of the housing 12 is configured to be detachably attached to the main body 12a with a bolt or the like, and the collet 11 is also configured to be detachably attached to the housing 12 in a state where the tip part 12c is detached from the main body 12a. This makes it possible to replace the collet 11 without detaching the handling unit 10, for example, from the tip part of a robot arm (not shown). Therefore, changing the gripping structure of the collet, changing the spring back amount, etc., can be performed easily.

FIGS. 3(a) and 3(b) are respectively a longitudinal sectional view and a rear view of a handling unit 20 according to a second embodiment. The second embodiment includes a collet 21, a housing 22, and an operation body 23 similar to those in the first embodiment, and can supply a fluid from a fluid supply port 22p into the cylinder structure through a connector 28 similar to that in the first embodiment. For this reason, a description of portions configured in a manner similar to that in the first embodiment shall be omitted. However, the present embodiment differs from the first embodiment in that a connector 29 is connected to a vent port 22q provided in a support part 22d of the housing 22 to allow a fluid to be supplied from the vent port 22q into an axial hole 21x through the connector 29 and to allow a fluid to be discharged from the inside of the axial hole 21x through the vent port 22q. Here, the vent port 22q forms the above fluid inlet/outlet in a case where the vent port 22q is connected to an exhaust device and/or a fluid supply source (to be described later).

By supplying a fluid such as air to the vent port 22q and blowing out the fluid from the inside of the axial hole 21x to the outside, powder dust mixed inside of the collet 21, dust adhering to gripping surfaces 21g of finger parts 21c, and the like can be blown away to clean the respective portions. Also, an object to be gripped can be drawn to the insides of the finger parts 21c and pulled to a predetermined gripping position or held with suction force itself by suction through the vent port 22q and the axial hole 21x. Here, in order to increase the above suction force, an easily deformable seal member such as a silicone resin may be placed inside slits 21s corresponding to the slits 11s described above so as to make the inside of the collet 21 have almost no communication with the outside when an object to be gripped is gripped by the respective gripping surfaces 21g of the plurality of finger parts 21c.

FIG. 4 is a longitudinal sectional view of a handling unit 30 according to a third embodiment. The third embodiment includes a collet 31, a housing 32, and an operation body 33 similar to those in the first embodiment, and can supply a fluid from a fluid supply port 32p into the cylinder structure through a connector 38 similar to that in the first embodiment. For this reason, a description of portions configured in a manner similar to that in the first or second embodiment shall be omitted. However, the present embodiment differs from the first embodiment in that a plurality of finger parts 31c of the collet 31 protrude from the tip part of the housing 32 to the axial direction tip side. Here, gripping surfaces 31g of the finger parts 31c are located at positions protruding from the tip part of the housing 32, therefore, the tip part of the housing 32 does not easily interfere with a structure around an object to be gripped. This makes it possible to perform gripping operations in a wider range of situations.

FIGS. 5(a) and 5(b) are respectively a longitudinal sectional view and a rear view of a handling unit 40 according to a fourth embodiment. The fourth embodiment includes a collet 41, a housing 42, and an operation body 43 similar to those in the first embodiment, and can supply a fluid from a fluid supply port 42p into the cylinder structure through a connector 48 similar to that in the first embodiment. For this reason, a description of portions configured in a manner similar to that in the first to third embodiments shall be omitted. However, the present embodiment differs from the first embodiment in that it includes a position detector 49 formed, for example, from a proximity sensor, which detects the position of a pressure reception part 43d of the operation body 43 in the axial direction. In the shown example, the position detector 49 includes a detection unit 49s placed inside a cylinder structure 42s so as to extend through a support part 42d from the base end part of the housing 42. Note that the position detector 49 suffices to be a detector which can detect the position of the operation body 43 in the axial direction with an accuracy sufficient to determine whether finger parts 41c of the collet 41 are in the gripped state or the non-gripped state. However, by making the position detector 49 have a sensor function capable of precisely detecting the position of the operation body 43 in the cylinder structure 42s, a more detailed situation can be detected, and this makes it possible to perform further detailed control under the control of a control unit (to be described later). For example, by detecting the stroke of the operation body 43 in the axial direction when the operation body 43 shifts from the non-gripped state to the gripped state, it is possible to estimate the gripping dimension (the gripping diameter, etc.) of an object to be gripped which is gripped by the plurality of finger parts 41c.

Figure 6:
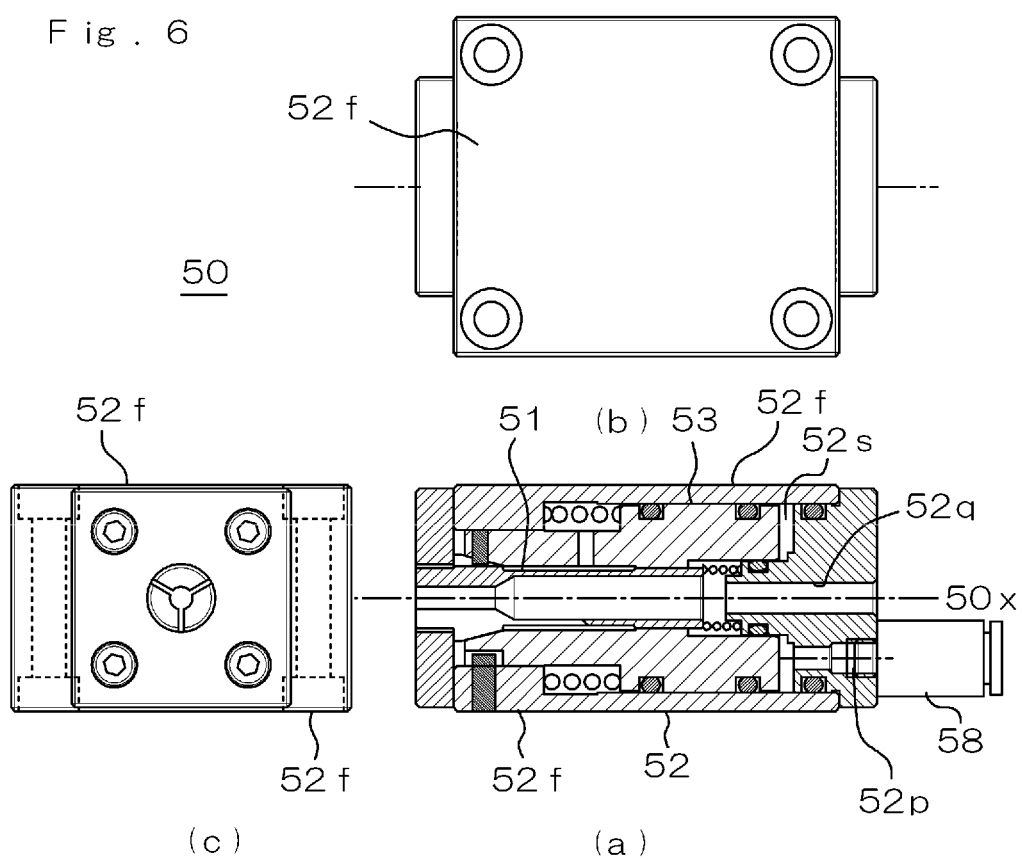
FIGS. 6(a), 6(b), and 6(c) are respectively a longitudinal sectional view, a plan view, and a front view of a handling unit according to a fifth embodiment.

FIGS. 6(a) and 6(b) are respectively a longitudinal sectional view and a front view of a handling unit 50 according to a fifth embodiment. The fifth embodiment includes a collet 51, a housing 52, and an operation body 53 similar to those in the first embodiment, and can supply a fluid from a fluid supply port 52p into a cylinder structure 52s through a connector 58 similar to that in the first embodiment. For this reason, a description of portions configured in a manner similar to that in the first to fourth embodiments shall be omitted. However, the present embodiment differs from the first embodiment in that the housing 52 has an outer surface structure having flat surfaces 52f. In the shown example, the flat surfaces 52f are formed on two surfaces, namely, the upper and lower surfaces, whereas the flat surface 52f may be formed on only one surface. By providing the flat surfaces 52f, when mounting the flat surfaces 52f on the attachment surface of the tip part of a robot arm, attachment of the handling unit 50 is facilitated, and the accuracy of the attachment posture and/or the attachment rigidity can be increased.

Figure 7:
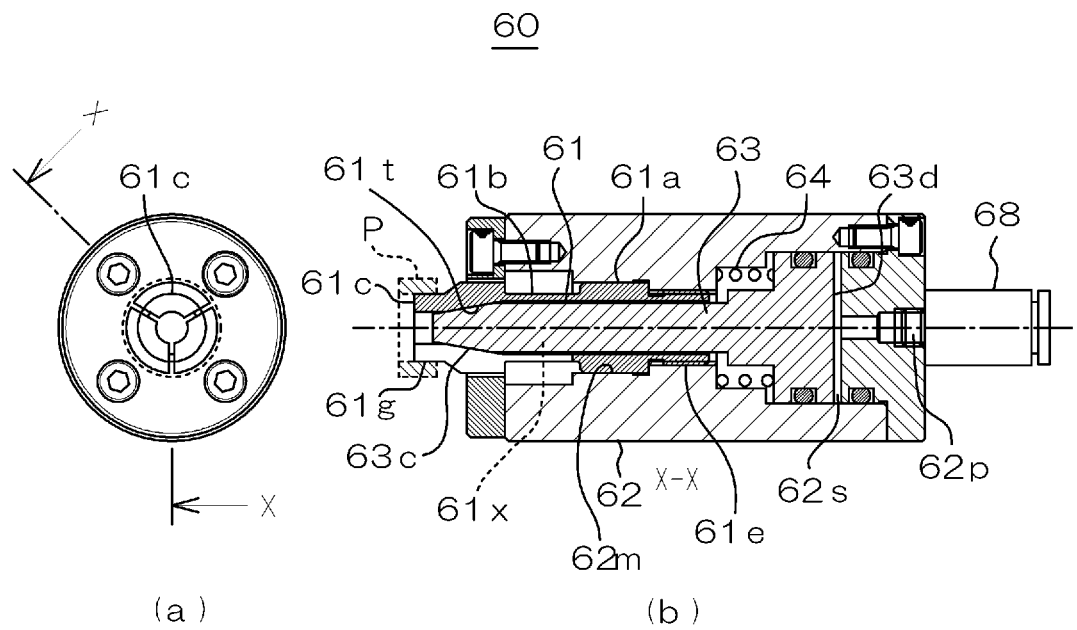
FIGS. 7(a) and 7(b) are respectively a front view and a longitudinal sectional view of a handling unit according to a sixth embodiment.

FIGS. 7(a) and 7(b) are respectively a front view and a longitudinal sectional view of a handling unit 60 according to a sixth embodiment. The sixth embodiment includes a collet 61, a housing 62, and an operation body 63 similar to those in the first embodiment, and can supply a fluid from a fluid supply port 62p into a cylinder structure through a connector 68 similar to that in the first embodiment. For this reason, a description of portions configured in a manner similar to that in the first to fifth embodiments shall be omitted. However, the present embodiment differs from the first embodiment in that the collet 61 includes a plurality of finger parts 61c having gripping surfaces 61g which grip the inner circumferential part of an object P to be gripped from inside. In accordance with this arrangement, the operation body 63 has, on the tip outer surface, a driving part 63c which passes through the inside of an axial hole 61x of the collet 61 and comes into contact with a driven part 61t formed from part of the internal surface of the collet 61 from inside to apply a driving force. Further, the collet 61 has a reference part 61a fitted in a support surface part 62m (in an inlay state) which is part of the internal surface of the housing 62 and a fixed part 61e, on the axial direction base end side, which has a male threaded part threadably engaged with a female threaded part formed in part of the internal surface of the housing 62. In the present embodiment, the position of the collet 61 in the axial direction is fixed by the threadable engagement of the fixed part 61e with respect to the housing 62, and the coaxial position and posture of the collet 61 along the axis are held by fitting of the reference part 61a with respect to the support surface part 62m of the housing 62. As in each embodiment described above, this configuration can improve the gripping accuracy and/or the repetition accuracy since the driving part 63c of the operation body 63 performs a gripping operation while the position and posture of the collet 61 are maintained at the time of an operation.

In the present embodiment, although the operation body 63 has a pressure reception part 63d formed on a base end part protruding from the inside of the collet 61 to the axial direction base end side, the pressure reception part 63d does not have an axial hole structure in a portion through which an axis 60x passes, unlike in each embodiment described above, and is also formed on the central portion through which the axis 60x passes. This configuration can increase the pressure reception area of the pressure reception part 63d without increasing the outer dimension. This makes it possible to increase the driving force of the operation body 63 while achieving downsizing. Note that a reference part 61a of the collet 61 may be configured such that the coaxial position and posture of the collet 61 with respect to the axis are held by making the outer surface of the operation body 63 located inside the collet 61 slide contact with the reference part 61a. At this time, as in the shown example, the collet 61 may be fixed in the axial direction with respect to the housing 62. Alternatively, as in the first embodiment, the collet 61 may be configured to be movable to the axial direction base end side while the collet 61 can be positioned at a locking position with respect to the housing 62.

Figure 8:
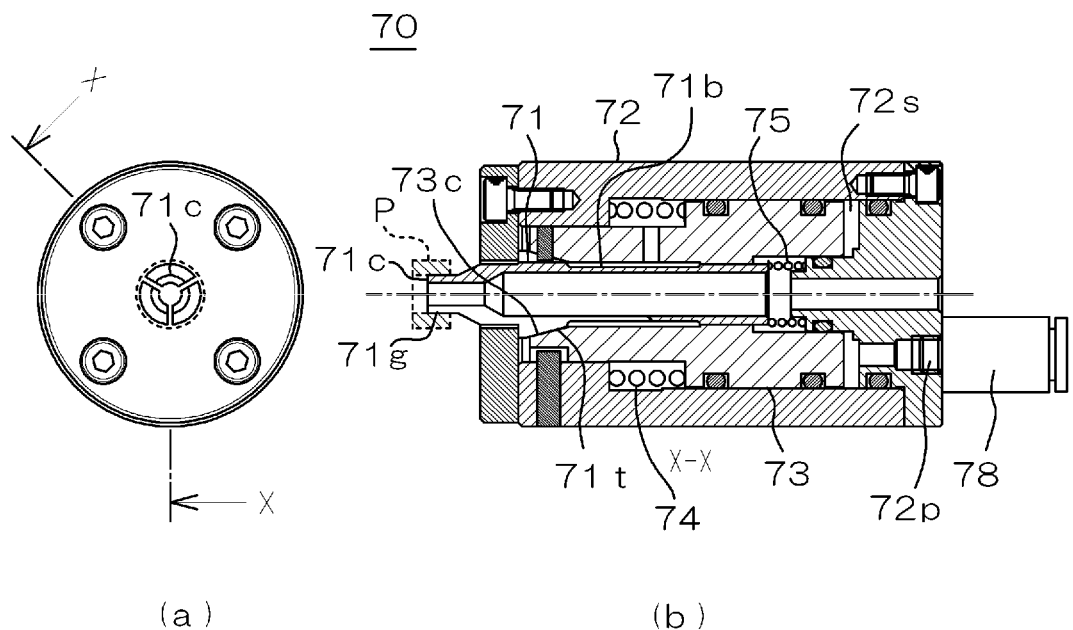
FIGS. 8(a) and 8(b) are respectively a front view and a longitudinal sectional view of a handling unit according to a seventh embodiment.

FIGS. 8(a) and 8(b) are respectively a front view and a longitudinal sectional view of a handling unit 70 according to a seventh embodiment. The seventh embodiment includes a collet 71, a housing 72, and an operation body 73 similar to those in the first embodiment, and can supply a fluid from a fluid supply port 72p into a cylinder structure 72s through a connector 78 similar to that in the first embodiment. For this reason, a description of portions configured in a manner similar to that in the first to sixth embodiments shall be omitted. However, the present embodiment differs from the first embodiment in the following point. In a state where the fluid pressure of the fluid described above is reduced or eliminated, a plurality of finger parts 71c of the collet 71 increase in diameter due to the elastic restoring force of elastic deformation parts 71b to grip an object P to be gripped from inside, thereby entering the gripped state. In contrast to this, in a state where the above fluid pressure is increased or applied, driving parts 73c apply driving forces to driven parts 71t to cause the plurality of finger parts 71c of the collet 71 to retreat from the object to be gripped due to the elastic deformation of the elastic deformation parts 71b toward the inside. That is, while the gripping mode of the collet 71 for the object P to be gripped is an inner diameter gripping mode as in the sixth embodiment, a basic structure is configured similar to that according to the first to fifth embodiments. However, the operation of the collet 71 is reverse to that of the collet in each of the first to fifth embodiments in that the collet 71 shifts from the gripped state to the non-gripped state due to the operation of the operation body 73, and returns from the non-gripped state to the gripped state due to the retreat of the operation body 73. The spring back amount of the collet 71 is designed to be a negative value. Accordingly, the collet 71 generates a gripping force based on the elastic restoring force of elastic deformation parts 71b in a state of receiving no driving force, whereas the gripping force is reduced or eliminated based on the elastic deformation caused by the reception of a driving force.

Figure 9:
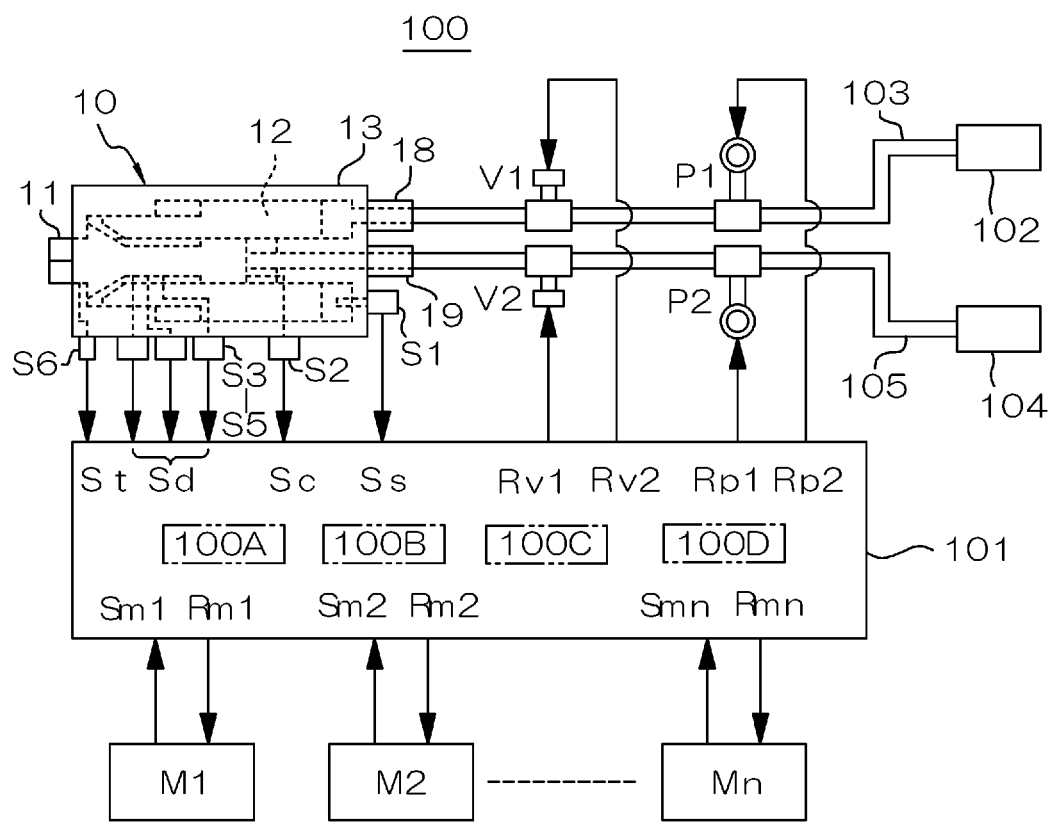
FIG. 9 is a block diagram showing a schematic arrangement of a handling device including a handling unit.

FIG. 9 is a block diagram schematically showing the entire arrangement of a handling device 100 configured by connecting the handling unit 10 according to each of the first to seventh embodiments to various types of robot structures. Note that the robot structure to be used is not specifically limited and may be a direct acting robot or scalar type robot. Although the handling unit 10 is shown in the shown example, the handling units 20 to 70 according to other embodiments described above can be used in a similar manner instead of the handling unit 10. The handling unit 10 is connected to a control unit 101 and is also connected to a fluid supply source 102 through the connector 18 described above. The fluid supply source 102 supplies a fluid through a pressure adjuster P1 and an on-off valve V1 installed along a fluid supply path 103. Examples of the fluid supply source 102 include compressed air supply sources such as a compressor and a gas cylinder.

The handling unit 10 is connected to an exhaust device 104 through a connector 19. The exhaust device 104 performs suction and exhaust of the inside (the axial hole 11x and the vent port 12q) of the handling unit 10 through a pressure adjuster P2 and an on-off valve V2 installed along an exhaust path 105. Note that a fluid supply source similar to that described above may be connected instead of the exhaust device 104 or the exhaust device and the fluid supply source may be connected in a switchable manner.

Various types of sensors which output detection signals to the control unit 101 can be installed in the handling unit 10. For example, the handling unit 10 can be provided with an operation body position detector S1 which detects the position of the operation body 13 in the axial direction and outputs a detection signal Ss as in the case of the position detector 49 according to the fourth embodiment, a collet position detector S2 which detects the position of the collet 11 in the axial direction and outputs a detection signal Sc, gripped mode detectors S3 to S5 which respectively detect an elastic deformation amount, and/or a voltage, a current, and the like based on distortion accompanying the elastic deformation at each of the plurality of elastic deformation parts 11b or finger parts 11c of the collet 11 and output detection signals Sd, and a gripping-object detector S6 which detects various physical amounts of an object to be gripped, such as a temperature detector which detects the temperature of the object P to be gripped, such as a thermocouple, a resistive sensor which detects an electric conductivity, or a vibration sensor which detects the vibration of the object P to be gripped, and which is installed at at least one of the plurality of finger parts 11c and outputs a detection signal St. Here, the gripped mode detectors S3 to S5 described above may be detectors which output the detection signals Sd respectively corresponding to the respective elastic deformation parts 11b and/or the respective finger parts 11c or may be detectors which output the differences and/or the ratios between sensor values among the plurality of elastic deformation parts 11b and/or the plurality of finger parts 11c as the detection signals Sd.

The control unit 101 of the handling device 100 controls driving parts M1, M2, . . . , Mn (n is a natural number equal to or more than 2) at the respective places in addition to the handling unit 10, the pressure adjusters P1 and P2, and the on-off valves V1 and V2 described above. The control unit 101 controls the supply pressure and/or the exhaust pressure of a fluid by outputting control signals Rp1 and Rp2 to the pressure adjusters P1 and P2. The control unit 101 also controls the supply and stop of a fluid and the start and end of exhaust by outputting control signals Rv1 and Rv2 to the on-off valves V1 and V2. In addition, the control unit 101 receives detection signals Sm1, Sm2, . . . , Smn from the position detectors installed at the driving parts M1, M2, . . . , Mn and outputs control signals Rm1, Rm2, . . . , Rmn to the driving parts M1, M2, . . . , Mn, thereby controlling the operation states of the driving parts. Note that the driving parts M1, M2, . . . , Mn include, for example, a unit driving system for controlling the position and posture of the handling unit 10, such as a driving mechanism for one or a plurality of robot arms.

Figure 10:
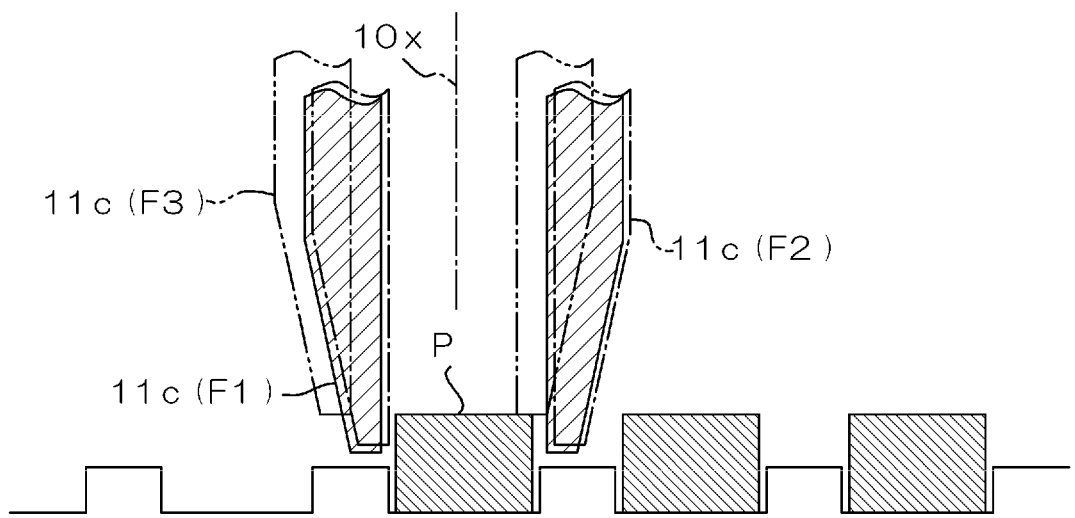
FIG. 10 is a view illustrating how the handling unit grips an object to be gripped.

FIG. 10 is a view illustrating how the finger parts 11c of the collet 11 of the handling unit 10 grip the object P to be gripped and move it to another place. Note that the shape of the finger part 11c is approximated to the shape of the finger part 31c in the third embodiment in accordance with the shape and/or the installation place of the object P to be gripped. Here, the control unit 101 described above controls the unit driving system such as the driving mechanism of the robot arm to control the position and posture of the handling unit 10, thereby setting each finger part 11c at a position and posture suitable for the object P to be gripped, then, the control unit 101 supplies a fluid into the cylinder structure 12s upon opening the on-off valve V1 to cause the operation body 13 to operate, thereby shifting each finger part 11c from the non-gripped state to the gripped state.

The control unit 101 described above can adopt various configurations. For example, the control unit 101 may be configured to control the respective parts in accordance with an operation program for the handling device 100 which are executed by an MPU (microprocessor unit). The operation program is configured to comprehend the situation of the handling unit 10 in accordance with the detection signals Ss, Sc, Sd, and St and control the pressure values of the pressure adjusters P1 and P2, the open/close states of the on-off valves V1 and V2, and the driving parts M1, M2, . . . , Mn including the unit driving system in accordance with the situation. The above operation program forms, for example, function implementation means 100A, 1006, 100C, 100D, etc., which execute the following various processes.

First, processing content performed by the function implementation means 100A shall be described. The function implementation means 100A is a means for controlling the gripping force of the finger parts 11c of the collet 11 by controlling the fluid pressure of the fluid supplied from the fluid supply source 102. The gripping force of the finger parts 11c of the collet 11 which is applied to the object P to be gripped is determined by making the driving parts 13c give the driven parts 11t the driving force determined by the difference between the elastic restoring force of the operation spring 14 and the operation force applied to the operation body 13 which is generated when a fluid pressure is applied to the pressure reception parts 13d. Accordingly, the above gripping force can be adjusted, set, or changed to an appropriate value by adjusting the fluid pressure using the pressure adjuster P1. The fluid pressure can be adjusted by using the control signal Rp1 from the control unit 101. At this time, the control unit 101 sets the control signal Rp1 to change the fluid pressure on the basis of at least one of the detection signal Ss from the operation body position detector S1, the detection signals Sd from the gripped mode detectors S3 to S5, and the detection signal St from the gripping-object detector S6. Here, since the magnitude of the gripping dimension of an object to be gripped can be estimated from the detection signal Ss in addition to the detection signals Sd (to be described below), the gripping force can be adjusted to a value suitable for the magnitude of the gripping dimension. In addition, since the hardness of the object to be gripped can be estimated from the detection signal St, the gripping force can be adjusted to a value suitable for the hardness.

For example, the collet 11 has an automatic aligning function, therefore, the plurality of elastic deformation parts 11b or finger parts 11c do not basically differ much in elastic deformation amount and/or distortion in the gripped state. Whereas, in a case where there are large differences, it can be considered that some kind of trouble has occurred in the gripped mode. For example, in a case where an object P to be gripped is soft, and the finger parts 11c bite into the object P to be gripped in an eccentric state when the plurality of finger parts 11c grip the object P to be gripped due to the fact that the axial center position of the handling unit 10 is shifted at the time of a gripping operation, and the finger parts 11c are consequently set in the gripped state while left in the eccentric state without the exertion of the aligning function of the collet 11, the respective finger parts 11c remain different in the gripped mode, this may cause the large differences described above. Accordingly, in this case, the finger parts 11c are temporarily returned to the non-gripped state to reduce the fluid pressure of the pressure adjuster P1, and in a state where the gripping force is reduced, the finger parts 11c are again shifted to the gripped state. In contrast to the above case, also in a case where the object P to be gripped shifts from the gripping surfaces 11g due to the gripping force being too weak, upon detecting this condition by the detection signals Sd from the gripped mode detectors S3 to S5, the finger parts 11c are temporarily returned to the non-gripped state to increase the fluid pressure, then the finger parts 11c are again shifted to the gripped state or the gripping force is increased by continuously increasing the fluid pressure. Note that the gripped mode detectors S3 to S5 can also detect the gripping force itself with which the finger parts 11c grip the object P to be gripped by detecting the distortion amount in the axial direction between each elastic deformation part 11b and a corresponding one of the finger parts 11c to which each elastic deformation part 11b is connected, instead of detecting the variances, differences, or ratios between the detection values obtained by the plurality of elastic deformation parts 11b and finger parts 11c. The detected value of the gripping force can be used in a manner similar to that in which the variances, differences, or ratios between the detection values obtained by the plurality of elastic deformation parts 11b or finger parts 11c are used, and can also be used as data for determining (estimating) the hardness of the object P to be gripped. Accordingly, the gripping force can also be corrected in a more suitable range by adjusting the fluid pressure in accordance with this data.

Next, the function implementation means 100B different from the above means shall be described. The function implementation means 100B is a means for controlling the collet 11 to enable it to grip an object to be gripped in a more suitable gripped state by controlling the pressure value of the pressure adjuster P2 of the exhaust device or the exhaust device 104 and the on/off state of the on-off valve V2. Note that, in a case where the exhaust device 104 is to be used, deformable seal members are preferably placed in the slits 11s to facilitate a reduction in the pressure in the axial hole 11x of the collet 11. In a case where the exhaust device 104 is used, for example, when the handling unit 10 approaches the object P to be gripped upon the operation of the unit driving system under the control of the control unit 101, the on-off valve V2 is opened in accordance with the control signal Rv2 from the control unit 101 to start exhausting the inside of the axial hole 11x through the vent port 12q before a gripping operation. This generates a suction force in the opening regions between the plurality of finger parts 11c at the tip of the collet 11. Accordingly, an object to be gripped is drawn between the plurality of finger parts 11c so as to be guided to the gripping position between the gripping surfaces 11g. In this case, the corner portions (the inner corner portions in the shown example) of the finger parts 11c which are located alongside the gripping position at the tips of the finger parts 11c are preferably provided with tapered guide portions to easily guide an object to be gripped into the opening region with the suction force described above.

Meanwhile, in a case where the fluid supply source 104 is to be used, the on-off valve V2 is opened in accordance with the control signal Rv2 from the control unit 101 to supply a fluid to the axial hole 11x through the vent port 12q before an object to be gripped is gripped. With this operation, a fluid is blown out from the inside of the axial hole 11x to the tip opening region between the finger parts 11c. This can remove dust and the like adhering to the axial hole 11x inside of the collet 11 and/or onto the gripping surfaces 11g inside the opening region.

Next, the function implementation means 100C different from the above means shall be described. The function implementation means 100C is a means for correcting the position and posture (or at least the position or the posture) of the handling unit 10 on the basis of at least one of the detection results obtained by the collet position detector S2 or the gripped mode detectors S3 to S5. A position F1 of each finger part 11c, which is indicated by the solid line in FIG. 10, is a proper position with respect to the object P to be gripped. At this position, the handling unit 10 is located at a proper position and is in a proper posture. On the other hand, there is a case where, due to an operation error or the like of the unit driving system, the axial center (axis 10x) of the finger parts 11c shifts from the regular position F1 with respect to the object P to be gripped and is set at a different position F2 and/or F3 in some cases. For example, at the position F2, the axial center of the plurality of finger parts 11c is slightly shifted from the center of the object P to be gripped to the right side in FIG. 10. Although it is difficult to detect such a slight positional shift, by using the gripped mode detectors S3 to S5, the deformation amounts of the elastic deformation parts 11b corresponding to the respective finger parts 11c are detected with time lags according to the detection signals Sd when the plurality of finger parts 11c shift from the non-gripped state to the gripped state. The position control amount of the unit driving system is then corrected by estimating positional shift amounts corresponding to the time lags and shifting directions corresponding to the time differences among the respective finger parts 11c. Note that when the plurality of finger parts 11c are set in the gripped state and the gripping of the object P to be gripped is completed, by the automatic aligning function of the collet 11, the center of the object P to be gripped is in a state matched with the axial center of the collet 11, that is, the axis 10x.

Meanwhile, at the position F3 described above, the axis of the plurality of finger parts 11c is further shifted from the center of the object P to be gripped. For this reason, in the course of operation of the unit driving system under the control of the control unit 101 to move the handling unit 10 to a position where it performs a gripping operation, in some cases, the tip of at least one of the finger parts 11c interferes with the object P to be gripped, as shown. When such a state is brought about, the collet 11 in the non-gripped state moves to the axial direction base end side against the elastic force of the holding spring 15. As a result, there is a concern that the driven part 11t receives a driving force from the driving part 13c of the operation body 13 in the non-operation state, and the collet 11 may shift to the gripped state. In such a case, before the collet 11 reaches the position where it performs a gripping operation, the detection signal Sd from any one of the gripped mode detectors S3 to S5 corresponding to the finger part 11c which has interfered with the object P to be gripped changes, or the detection signal Sc from the collet position detector S2 which detects the position of the collet 11 in the axial direction changes, and the control unit 101 thereby estimates a positional shift amount and a shifting direction and corrects the position control amount of the unit driving system. In this case, the azimuth and amount of a positional shift in the horizontal direction can be estimated by determining which one of the finger parts 11c corresponds to the changed detection signals Sd from the gripped mode detectors S3 to S5 and determining how many of the plurality of finger parts 11c correspond to the changed detection signals Sd. In addition, it is also possible to estimate the amount of positional shift in the vertical direction by detecting the retreat amount of the collet 11 in accordance with the detection signal Sd from the position detector S2. Accordingly, the azimuth and/or amount of the positional shift of the unit driving system can be three-dimensionally detected, and positional shifts due to various causes can therefore be eliminated.

Another function implementation means 100D shall be described. The function implementation means 100D is a means for determining the situation of the object P to be gripped on the basis of at least any one of the detection signal Ss from the operation body position detector S1, the detection signals Sd from the gripped mode detectors S3 to S5, and the detection signal St from the gripping-object detector S6, and executing an operation in accordance with the situation, for example, distributing and sorting objects to be gripped or selecting another processing content. For example, it is possible to estimate the gripping dimension (gripping diameter) of an object to be gripped in accordance with the detection result obtained by operation body position detector S1 as described above, and it is therefore possible to select a determination process on the basis of pass/fail judgement based on gripping dimensions, a sorting process corresponding to gripping dimensions, and/or subsequent processing content. The gripping-object detector S6 is configured to detect various types of physical amounts of an object to be gripped as described above. Accordingly, when an object to be gripped is gripped, the control unit 101 can grasp information about the physical amount (temperature, electric conductivity, presence/absence of vibration, or the like) of the object to be gripped on the basis of the detection signal St. Based on the detected physical amount, the control unit 101 can also estimate other attributes of an object to be gripped which correlate with the physical amount. For example, the control unit 101 can estimate a structural defect and the like in an object to be gripped on the basis of detected data such as an electric conductivity, thermal conductivity, or resonance frequency. When it is possible to perform pass/fail judgement on objects to be gripped, it is accordingly possible to, by controlling the unit driving system by the control unit 101, select transfer destinations, determine whether to perform transfer, and select other types of processes from a plurality of options in accordance with the pass/fail judgement. In addition, it is also possible to assume that, in a state where the handling unit 10 grips an object to be gripped, for example, the control unit 101 may cause the unit driving system to press the object to be gripped against a rotating tool to perform processing on the object to be gripped. By acquiring the vibration data of the object to be gripped at this time, the suitability of processing on the object to be gripped or the suitability of a gripping force for the object to be gripped can be determined. Then, based on such determination, the control unit 101 can control the change of processing conditions for an object to be gripped, the end of processing, the adjustment of a gripping force, and the like. In addition, the control unit 101 can estimate the gripping dimension (the gripping diameter, etc.) of an object to be gripped which is gripped by the plurality of finger parts 11c by detecting the stroke of the operation body 13 in the axial direction at the time of shifting from the non-gripped state to the gripped state. This makes it possible to estimate the shape dimensions (the outer diameter, the inner diameter, etc.) of the object to be gripped on the basis of the estimated gripping dimensions and to select and execute processing content from a plurality of options in accordance with the estimated shape dimensions as in the above case.

The method and the device according to the present invention are not limited to those shown examples and can be variously modified without departing from the gist of the present invention. For example, although the respective embodiments have mutually different configurations, the configurations of the respective embodiments can be variously employed in an arbitral combination by, for example, being replaced with each other or being combined with each other, as long as no trouble is caused therebetween. In the above embodiments, although each handling unit is configured on the assumption that the unit driving system of the handling device can control the handling unit so as to be set at an arbitrary position and posture, additional functions can be given to the handling unit, for example, incorporating a pivoting mechanism around the axis of the collet, the housing, and the operation body in the handling unit, etc.

REFERENCE SIGNS LIST

10 . . . handling unit, 10x . . . axis, 11 . . . collet, 11a . . . reference part, 11b . . . elastic deformation part, 11c . . . finger part, 11d . . . locking stepped part, 11s . . . slit, 11g . . . gripping surface, 11p . . . regulating groove, 12 . . . housing, 12a . . . main body, 12b . . . base end part, 12c . . . tip part, 12d . . . support part, 12e . . . inner stepped part, 12k . . . support part, 12p . . . fluid supply port, 12q . . . vent port, 12o . . . opening part, 12s . . . cylinder structure, 13 . . . operation body, 13*a* . . . axial hole, 13*b* . . . support surface part, 13*c* . . . driving part, 13*d* . . . pressure reception part, 13*e* . . . outer stepped part, 13*k* . . . supported part, 13*p* . . . regulating groove, 13*s* . . . cylinder slide contact part, 13*t* . . . vent path, 14 . . . operation spring, 15 . . . holding spring, 16 . . . inner circumferential side regulating pin, 17 . . . outer circumferential side regulating pin, 100 . . . handling device, 101 . . . control unit, S1 . . . operation body position detector, S2 . . . collet position detector, S3-S5 . . . gripping mode detector, S6 . . . gripping-object detector, M1, M2, . . . , Mn . . . driving part (including unit driving system)

What is claimed is:

1. A handling unit comprising:
a collet, a housing, and an operation body wherein
the collet integrally includes:
   a reference part provided on part of the collet in an axial direction;
   a plurality of elastic deformation parts connected to an axial direction tip side of the reference part;
   a plurality of finger parts connected to an axial direction tip side of the plurality of elastic deformation parts, respectively; and
   a plurality of driven parts which receives driving force caused by elastic deformation of the plurality of elastic deformation parts when the plurality of finger parts moves in a radial direction,
the housing encloses the collet and includes:
   a cylinder structure which is placed on an outer circumferential side or an axial direction base end side of the collet and which has a fluid supply port; and
   a collet locking part which locks the collet at a predetermined locking position in the axial direction,
the operation body includes:
   a driving part which provides the driving force to the plurality of driven parts to cause the elastic deformation;
   a pressure reception part which receives fluid pressure supplied from the fluid supply port inside the cylinder structure; and
   a cylinder slide contact part which slides and contacts with an internal surface of the cylinder structure so as to move air-tightly in the axial direction,
a coaxial position and posture of the reference part with respect to an axis are held by the housing or the operation body, and
the coaxial position and posture of the reference part with respect to the axis are held due to the fact that the reference part movably slides and contacts with a collet slide contact part provided with the operation body in the axial direction.

2. The handling unit according to claim 1, wherein
the operation body includes the collet slide contact part which is located on a range of mutual overlap between the cylinder slide contact part and the internal surface of the cylinder structure in the axial direction on the condition that the cylinder slide contact part and the internal surface of the cylinder structure are air-tightly configured in the axial direction.

3. The handling unit according to claim 2, wherein
the driving part provides the driving force to the plurality of driven parts of the collet while the cylinder slide contact part slides on the internal surface of the cylinder structure and the collet slide contact part slides on the collet on the condition that the operation body moves to the axial direction tip side due to the fact that the pressure reception part receives the fluid pressure.

4. The handling unit according to claim 3, wherein
the collet locking part of the housing locks the collet from the axial direction tip side, and the collet is prevented by the collet locking part at the predetermined locking position from moving to the axial direction tip side, and
the collet is designed to be movable from the predetermined locking position to the axial direction base end side in a state where the coaxial position and posture of the reference part with respect to the axis are held, and
a collet biasing means is further included, and the collet biasing means is configured to hold the collet in a state in which the collet is locked to the collet locking part by biasing the collet to the axial direction tip side with respect to the housing.

5. The handling unit according to claim 4, wherein
the collet includes an axial hole passing through the collet in the axial direction, and
a fluid supply/discharge port is provided to enable supply of fluid from the inside of the axial hole toward the axial direction tip side, or is provided to enable discharge of fluid from the axial direction tip side through the axial hole.

6. A handling unit comprising:
a collet, a housing, an operation body, and an operation body biasing means, wherein
the collet integrally includes:
   a reference part provided on part of the collet in an axial direction;
   a plurality of elastic deformation parts connected to an axial direction tip side of the reference part;
   a plurality of finger parts connected to an axial direction tip side of the plurality of elastic deformation parts, respectively; and
   a plurality of driven parts which receives driving force caused by elastic deformation of the plurality of elastic deformation parts when the plurality of finger parts moves in a radial direction,
the housing encloses the collet and includes:
   a cylinder structure which is placed on an outer circumferential side or an axial direction base end side of the collet and which has a fluid supply port;
   a collet locking part which locks the collet at a predetermined locking position in the axial direction,
   a tip side internal surface portion placed on an internal surface on the axial direction tip side of the housing; and
   a base end side internal surface portion placed on an internal surface of the cylinder structure through a first stepped part which increases an inner dimension of the tip side internal surface portion on the axial direction base end side and which is formed on the axial direction tip side with respect to a second stepped part, and
the operation body includes:
   a driving part which provides the driving force to the plurality of driven parts to cause the elastic deformation;
   a pressure reception part which receives fluid pressure supplied from the fluid supply port inside the cylinder structure; and
   a cylinder slide contact part which slides and contacts with an internal surface of the cylinder structure so as to move air-tightly in the axial direction;
   a tip side outer surface portion placed on an outer surface in a range in which the position in the axial direction overlaps the tip side internal surface portion; and a base end side outer surface portion including the cylinder slide contact part provided through the second stepped part which increases an outer dimension of the tip side outer surface portion on the axial direction base end side of the operation body, and
the operation body biasing means is placed between the first stepped part and the second stepped part, and formed of an elastic body which biases the operation body toward the axial direction base end side due to elastic restoring force, and
a coaxial position and posture of the reference part with respect to an axis are held by the housing or the operation body.

7. The handling unit according to claim 6, wherein
the driving part of the operation body drives the plurality of driven parts of the collet to an inner circumferential side in a state where the tip side outer surface portion of the operation body is supported on the tip side internal surface portion of the housing from an outer circumferential side.

8. The handling unit according to claim 7, wherein
the coaxial position and posture of the reference part with respect to the axis are held due to the fact that the reference part movably slides and contacts with a collet slide contact part provided with the operation body in the axial direction.

9. The handling unit according to claim 8, wherein
the operation body includes the collet slide contact part which is located on a range of mutual overlap between the cylinder slide contact part and the internal surface of the cylinder structure in the axial direction on the condition that the cylinder slide contact part and the internal surface of the cylinder structure are air-tightly configured in the axial direction.

10. The handling unit according to claim 9, wherein
the driving part provides the driving force to the plurality of driven parts of the collet while the cylinder slide contact part slides on the internal surface of the cylinder structure and the collet slide contact part slides on the collet on the condition that the operation body moves to the axial direction tip side due to the fact that the pressure reception part receives the fluid pressure.

11. The handling unit according to claim 10, wherein
the collet locking part of the housing locks the collet from the axial direction tip side, and the collet is prevented by the collet locking part at the predetermined locking position from moving to the axial direction tip side, and
the collect is designed to be movable from the predetermined locking position to the axial direction base end side in a state where the coaxial position and posture of the reference part with respect to the axis are held, and
a collet biasing means is further included, and the collet biasing means is configured to hold the collet in a state in which the collet is locked to the collet locking part by biasing the collet to the axial direction tip side with respect to the housing.

12. The handling unit according to claim 11,
the collet includes an axial hole passing through the collet in the axial direction, and
a fluid supply/discharge port is provided to enable supply of fluid from the inside of the axial hole toward the axial direction tip side, or is provided to enable discharge of fluid from the axial direction tip side through the axial hole.

13. A handling devise comprising:
a handling unit, a unit driving system, a fluid supply means, and a control unit, wherein
the handling unit includes a collet, a housing, and an operation body,
the collet integrally contains:
 a reference part provided on part of the collet in an axial direction;
 a plurality of elastic deformation parts connected to an axial direction tip side of the reference part;
 a plurality of finger parts connected to an axial direction tip side of the plurality of elastic deformation parts, respectively; and
 a plurality of driven parts which receives driving force caused by elastic deformation of the plurality of elastic deformation parts when the plurality of finger parts moves in a radial direction,
the housing encloses the collet and contains:
 a cylinder structure which is placed on an outer circumferential side or an axial direction base end side of the collet and which has a fluid supply port; and
 a collet locking part which locks the collet at a predetermined locking position in the axial direction,
the operation body contains:
 a driving part which provides the driving force to the plurality of driven parts due to the elastic deformation;
 a pressure reception part which receives fluid pressure supplied from the fluid supply port inside the cylinder structure; and
 a cylinder slide contact part which slides and contacts with an internal surface of the cylinder structure so as to move air-tightly in the axial direction,
a coaxial position and posture of the reference part with respect to an axis are held by the housing or the operation body,
the unit driving system determines a position and posture of the handling unit,
the fluid supply means supplies fluid into the cylinder structure, and
the control unit controls the unit driving system and the fluid supply means.

14. The handling device according to claim 13, wherein
the coaxial position and posture of the reference part with respect to the axis are held due to the fact that the reference part movably slides and contacts with a collet slide contact part provided with the operation body in the axial direction.

15. The handling device according to claim 14, wherein
the operation body includes the collet slide contact part which is located on a range of mutual overlap between the cylinder slide contact part and the internal surface of the cylinder structure in the axial direction on the condition that the cylinder slide contact part and the internal surface of the cylinder structure are air-tightly configured in the axial direction.

16. The handling device according to claim 15, wherein
the driving part provides the driving force to the plurality of driven parts of the collet while the cylinder slide contact part slides on the internal surface of the cylinder structure and the collet slide contact part slides on the collet on the condition that the operation body moves to the axial direction tip side due to the fact that the pressure reception part receives the fluid pressure.

17. The handling device according to claim 13, further comprising at least one of:
an operation body position detection means which detects a position of the operation body in the cylinder structure in the axial direction, a gripping mode detection means which detects an individual displacement mode of the plurality of finger parts or the plurality of elastic deformation parts, or a difference in or a ratio of the individual displacement mode, and a gripping-object detection means which detects a physical amount of an object gripped by the plurality of finger parts, wherein the control unit controls fluid pressure based on at least one of detection results obtained from the operation body position detection means, the gripping mode detection means, or the gripping-object detection means.

18. The handling device according to claim 13, further comprising at least one of:

a collet position detection means which detects a position of the collet in the axial direction, and a gripping mode detection means which detects an individual displacement mode of the plurality of finger parts or the plurality of elastic deformation parts, or a difference in or a ratio of the individual displacement mode, wherein the control unit corrects the position or posture of the handling unit based on at least one of detection results obtained from the collet position detection means or the gripping mode detection means.

19. The handling device according to claim 13, further comprising at least one of:

an operation body position detection means which detects a position of the operation body in the cylinder structure in the axial direction, a gripping mode detection means which detects an individual displacement mode of the plurality of finger parts or the plurality of elastic deformation parts, or a difference in or a ratio of the individual displacement mode, and a gripping-object detection means which detects a physical amount of an object gripped by the plurality of finger parts, wherein the control unit selects and executes a processing content for the object from a plurality of options based on at least one of detection results obtained from the operation body position detection means, the gripping mode detection means, or the gripping-object detection means.

\* \* \* \* \*